(12) United States Patent
Sherman et al.

(10) Patent No.: US 10,568,419 B2
(45) Date of Patent: Feb. 25, 2020

(54) ROOM CADDIE

(71) Applicant: PPJ, LLC, Natick, MA (US)

(72) Inventors: Philip Reid Sherman, Melville, NY (US); Horace Robert Eskridge, III, Lexington, KY (US)

(73) Assignee: PPJ, LLC, Natick, MA (US)

( * ) Notice: Subject to any disclaimer, the term of this patent is extended or adjusted under 35 U.S.C. 154(b) by 0 days.

(21) Appl. No.: 15/807,779

(22) Filed: Nov. 9, 2017

(65) Prior Publication Data

US 2019/0133315 A1      May 9, 2019

(51) Int. Cl.

| | |
|---|---|
| *A47B 23/06* | (2006.01) |
| *B65D 1/24* | (2006.01) |
| *B65D 43/16* | (2006.01) |
| *B65D 25/24* | (2006.01) |
| *A47B 79/00* | (2006.01) |
| *F16M 11/40* | (2006.01) |

(Continued)

(52) U.S. Cl.
CPC .............. *A47B 23/06* (2013.01); *A47B 23/04* (2013.01); *A47B 79/00* (2013.01); *B65D 1/24* (2013.01); *B65D 25/24* (2013.01); *B65D 43/16* (2013.01); *F16M 11/40* (2013.01); *A47B 2220/0075* (2013.01); *A47B 2220/0094* (2013.01); *A47G 23/0216* (2013.01); *A47G 2023/0283* (2013.01); *A47G 2200/08* (2013.01)

(58) Field of Classification Search
CPC ......... A47B 23/04; A47B 23/06; A47B 79/00; A47B 2220/0094; A47G 23/0216; A47G 2023/0283; A47G 2200/08; B65D 1/24; B65D 25/24; B65D 43/16; B65D 2543/00537; F16M 11/40

See application file for complete search history.

(56) References Cited

U.S. PATENT DOCUMENTS

| | | | | |
|---|---|---|---|---|
| 2,716,045 A | * | 8/1955 | Berner ................. | A47B 23/046 108/147 |
| 4,538,861 A | * | 9/1985 | Hughes, Jr. ............ | A47B 23/04 190/10 |

(Continued)

OTHER PUBLICATIONS

Atlantic Furniture AH13214 Mission Side Table Rubber Wood, Walnut. Sales Information [online]. Atlantic Furniture. Date First Listed on Amazon Mar. 17, 2016 [retrieved on Dec. 18, 2018]. Retrieved from the Internet: <URL: https://www.amazon.com/Atlantic-Furniture-AH13214-Mission-Rubber/dp/B072HK6DY1/ref=sr_1_2?ie=UTF8&qid=1549463112&sr=8-2&keywords=powered+side+table+%2B+Atlantic+Furniture; Dec. 18, 2018.

(Continued)

*Primary Examiner* — Hanh V Tran
(74) *Attorney, Agent, or Firm* — Patent Portfolio Builders PLLC

(57) ABSTRACT

A room caddie having a self-supporting box with a first interior chamber extending into the box from the top and a second interior chamber separate from the first interior chamber. The second interior space comprising a plurality of interior electrical power sources. A fixed cover is disposed over the first interior chamber and includes a cylindrical cup holder, at least one exterior electrical power source and a first part of a two-part releasable connector disposed in the fixed cover. A moveable lid is disposed over the second interior chamber at the top of box to provide access into the second interior chamber.

20 Claims, 10 Drawing Sheets

(51) Int. Cl.
*A47B 23/04* (2006.01)
*A47G 23/02* (2006.01)

(56) References Cited

U.S. PATENT DOCUMENTS

| | | | | |
|---|---|---|---|---|
| 4,654,762 | A * | 3/1987 | Laverick | B43L 5/007 108/23 |
| 5,037,162 | A * | 8/1991 | Ransom | A47B 23/04 224/926 |
| 5,377,946 | A * | 1/1995 | Pannu | A47B 23/002 248/456 |
| 5,460,102 | A * | 10/1995 | Pasmanick | A47B 23/002 108/25 |
| 5,979,337 | A * | 11/1999 | Clark | A47B 23/06 108/23 |
| 6,302,037 | B1 | 10/2001 | Frari | |
| 8,327,774 | B1 * | 12/2012 | Rivera | B60N 3/005 108/44 |
| 2006/0077286 | A1 * | 4/2006 | Wenderski | F16M 11/40 348/373 |
| 2006/0080972 | A1 | 4/2006 | Krieger et al. | |
| 2007/0154254 | A1 * | 7/2007 | Bevirt | F16M 11/40 403/56 |
| 2008/0266835 | A1 * | 10/2008 | Chang | A47B 23/06 362/98 |
| 2013/0043200 | A1 * | 2/2013 | Johnson | A47G 9/1045 211/69.1 |
| 2013/0248538 | A1 * | 9/2013 | Veltrop | F25D 23/00 220/592.02 |
| 2013/0341338 | A1 * | 12/2013 | Mitchell | A45C 11/20 220/592.2 |
| 2014/0091193 | A1 * | 4/2014 | Simon | A47B 23/02 248/451 |
| 2015/0173533 | A1 | 6/2015 | Dolar et al. | |
| 2015/0321336 | A1 * | 11/2015 | Harrison | B25H 3/02 206/349 |
| 2016/0120303 | A1 * | 5/2016 | Constantino | F16M 11/42 108/28 |
| 2016/0331134 | A1 * | 11/2016 | Harrington | A47B 23/043 |
| 2016/0332778 | A1 * | 11/2016 | Roman | B65D 21/0233 |
| 2017/0264329 | A1 * | 9/2017 | Balmer | A45F 5/10 |
| 2017/0314732 | A1 * | 11/2017 | Minn | F16M 13/022 |
| 2018/0003338 | A1 * | 1/2018 | Scott | A45F 5/00 |
| 2018/0127150 | A1 * | 5/2018 | Adanur | A47B 57/10 |
| 2018/0153311 | A1 * | 6/2018 | Waggoner | A47C 21/00 |

OTHER PUBLICATIONS

Customizable Adjustable Bedz Introduces Multifunctional Room Caddie Table, Article [online]. Sleep Retailer. Jul. 26, 2017. [retrieved on Dec. 15, 2018]. Retrieved from the Internet: <URL: https://https://sleepretailer.com/accessories/customatic-adjustable-bedz-introduces-multifunctional-room-caddie-table/; Dec. 15, 2018.

International Search Report and Written Opinion in International Application No. PCT/US2018/059796 dated Jan. 18, 2019.

Premium 3550 Chairside End Tablewith USB and Power Outlet Charging Ports and Tray in Espresso, Sales Information (online). Cases & Pieces. Date First Listed on Amazon Jun. 5, 2017. [retrieved on Dec. 18, 2018]; Retrieved from the internet: URL: https://www.amazon.com/Premium-3550-Chairside-Charging-Espresso/dp/B071JVKFNG/ref=sr_1_9?le=UTF8&qid=1545194422&sr=8-9keywords=powered+side+table%3E. Dec. 18, 2018.

* cited by examiner

ROOM CADDIE

TECHNICAL FIELD

Embodiments of the subject matter disclosed herein relate to caddies for use with furniture and bedding.

BACKGROUND

Increasingly, laptop computers, tablet computers and smartphones are used to obtain and view news, to access multi-media content, to play games or to read books in electronic format. Often these devices are used while sitting on comfortable furniture or while relaxing in bed. Given the relative size of these devices, the need to access the touch screens associated with these devices, the use of headphones in conjunction with these devices and the desire to not disturb others, these devices are often placed in close physical proximity to the person viewing or reading the desired content. A location for placing the devices adjacent the user may not exist or may not provide a satisfactory viewing angle, and holding the devices for extended periods of time leads to fatigue. Support surfaces such as tables are large and cumbersome and restrict movement. In addition, the devices need a source of power for extended periods of use.

SUMMARY

Exemplary embodiments are directed to a room caddie that is self-supporting and independent of other furniture and that can be moved and located next to multiple types of furniture including chairs and beds. The room caddie provides support for an object such as a laptop computer, tablet computer, smartphone or conventional book. The location and orientation of the supported object can be adjusted as desired by the user, and the room caddie holds the object at the desired location and orientation. The room caddie also provides sources of power, both AC and DC sources, for operation and charging of the devices. Storage is provided in the room caddie for the objects. In one embodiment, the room caddie also provides a beverage holder, which can also keep the beverages heated or cooled, a light source and speakers, including blue tooth speakers. Preferably, the room caddie is upholstered or upholstered and padded and can be coordinated with a pre-determined décor.

Exemplary embodiments are directed to a room caddie having a self-supporting box with a top extending from a first end of the box to a second end of the box opposite the first end, a first interior chamber extending into the box from the top and disposed adjacent the first end of the box and a second interior chamber separate from the first interior chamber, extending into the box from the top and located between the first interior chamber and the second end. The second interior space contains a plurality of interior electrical power sources. A fixed cover is disposed over the first interior chamber at the top of the box. The fixed cover includes a cylindrical cup holder disposed on the fixed cover and extending into the first interior chamber, at least one exterior electrical power source disposed in the fixed cover and a first part of a two-part releasable connector disposed in the fixed cover. A moveable lid is disposed over the second interior chamber at the top of box to provide access into the second interior chamber.

In one embodiment, the box includes a bottom opposite the top, and the first interior chamber extends between the bottom of the box and the second interior chamber. In one embodiment, the power sources in the plurality of interior electrical power sources include at least one AC power source and at least one DC power source. In one embodiment, the fixed cover further includes an illuminated ring surrounding the cylindrical cup holder. In one embodiment, the cylindrical cup holder includes at least one of a heating mechanism and a cooling mechanism.

In one embodiment, the exterior electrical power source is a universal serial bus port. In one embodiment, the moveable lid is attached to the second end of the box by a hinge, for example, a piano hinge. In one embodiment, the fixed cover includes a rectangular area on a top surface that is constructed of a water-proof material. The cylindrical cup holder is disposed in and surrounded by the rectangular area. In one embodiment, the box, the fixed cover and the moveable lid have upholstered surfaces.

In one embodiment, the self-supporting box includes a bottom opposite the top and a pair of opposing sides spaced from each other and extending from the first end to the second end and from the top to the bottom. The bottom includes a cavity extending into the bottom towards the top. The cavity is spaced from the first end and the second end and extends between the opposing sides. In one embodiment, the box includes a bottom opposite the top and a plurality of extensible legs attached to the bottom.

The room caddie includes an object holder. The object holder includes a flexible arm capable of maintaining a selected shape, a second part of the two-part releasable connector attached to the flexible arm and an object attachment mechanism attached to the flexible arm. In one embodiment, the flexible arm is a pliable rod. In another embodiment, the flexible arm is constructed from a plurality of individual articulated metal sections connected together in series. Each pair of adjacent sections separately positionable with respect to each other. In one embodiment, the flexible arm has a length of up to about 36 inches.

In one embodiment, the first part of the two-part releasable connector is a socket, and the second part of the two-part releasable connector is an insert sized and shaped to fit within the socket. The insert rotatable within the socket. In one embodiment, the object attachment mechanism includes a fixed member attached to the flexible arm and having a support surface to support an object and a clamping member attached to the fixed member and having a clamping surface to engage the object. The object is disposed between the clamping surface and the support surface, and the clamping member is moveable with respect to the fixed member to change a distance between the clamping surface and the support surface. In one embodiment, the clamping member contains a plurality of holes that provide access through the clamping surface to the object.

In one embodiment, the object holder also includes an extender configured to attach to the holes in the clamping surface to accommodate objects having dimensions greater than a maximum distance between the support surface and the clamping surface. In one embodiment, the clamping member is lockable at any given distance between the clamping surface and the support surface.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a given feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the features, structures or characteristics may be combined in any suitable manner in one or more embodiments.

Figure 1:
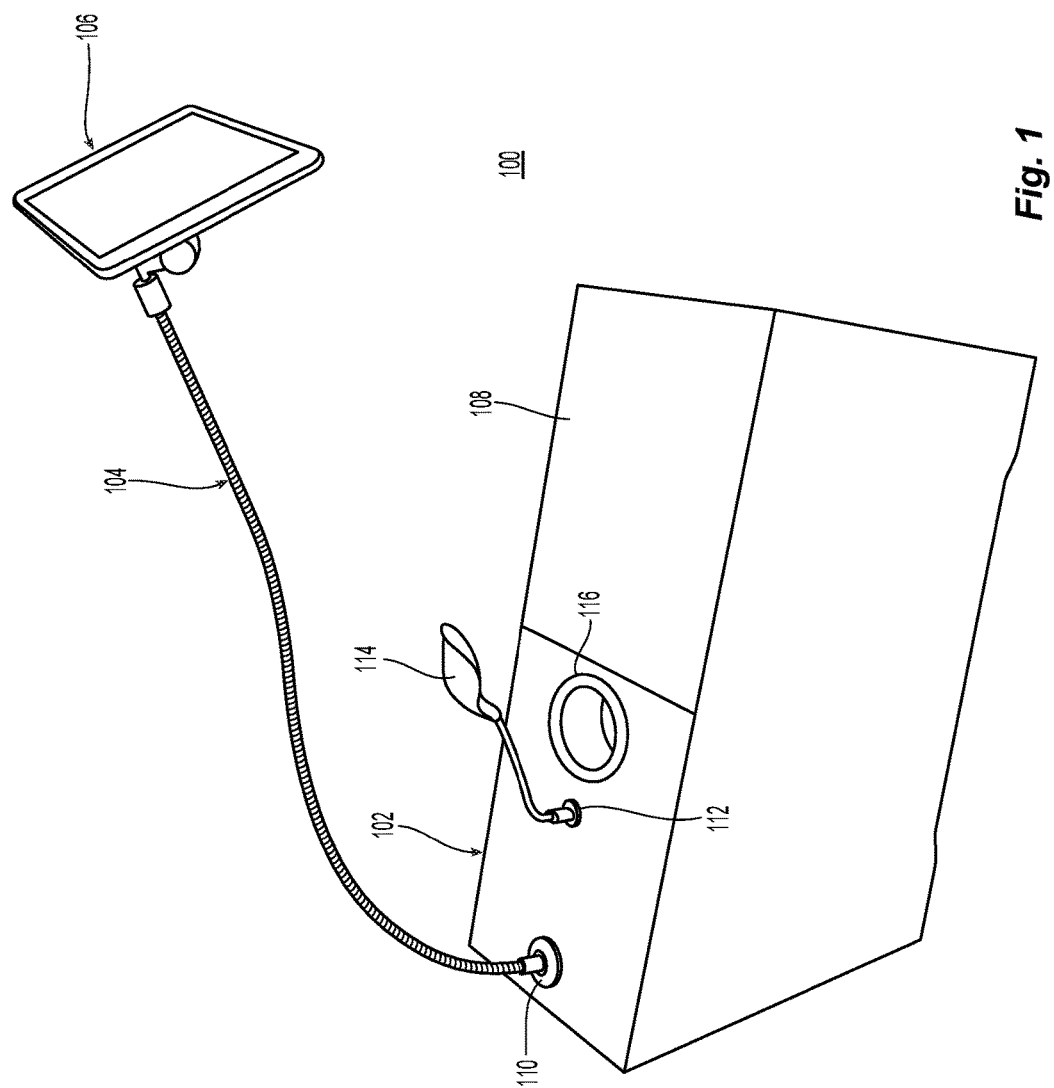
FIG. 1 is a top perspective view of an embodiment of a room caddie.
Figure 2:
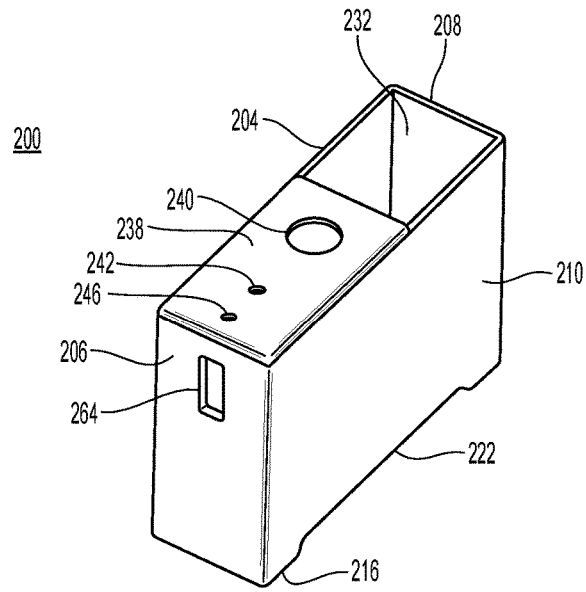
FIG. 2 is a is a top perspective view of an embodiment of a self-supporting box.
Figure 3:
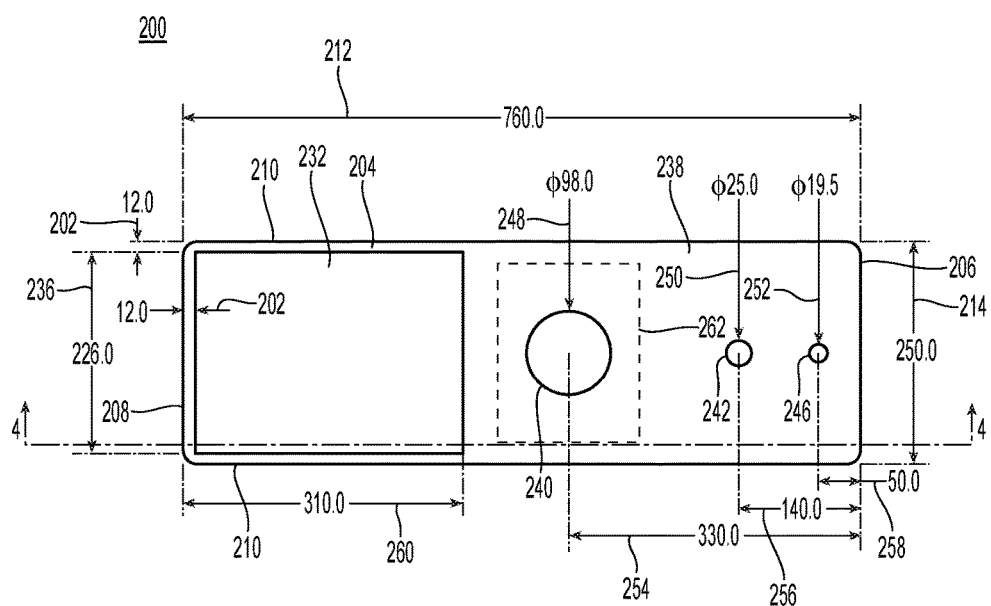
FIG. 3 is a is a top view of an embodiment of the self-supporting box.
Figure 4:
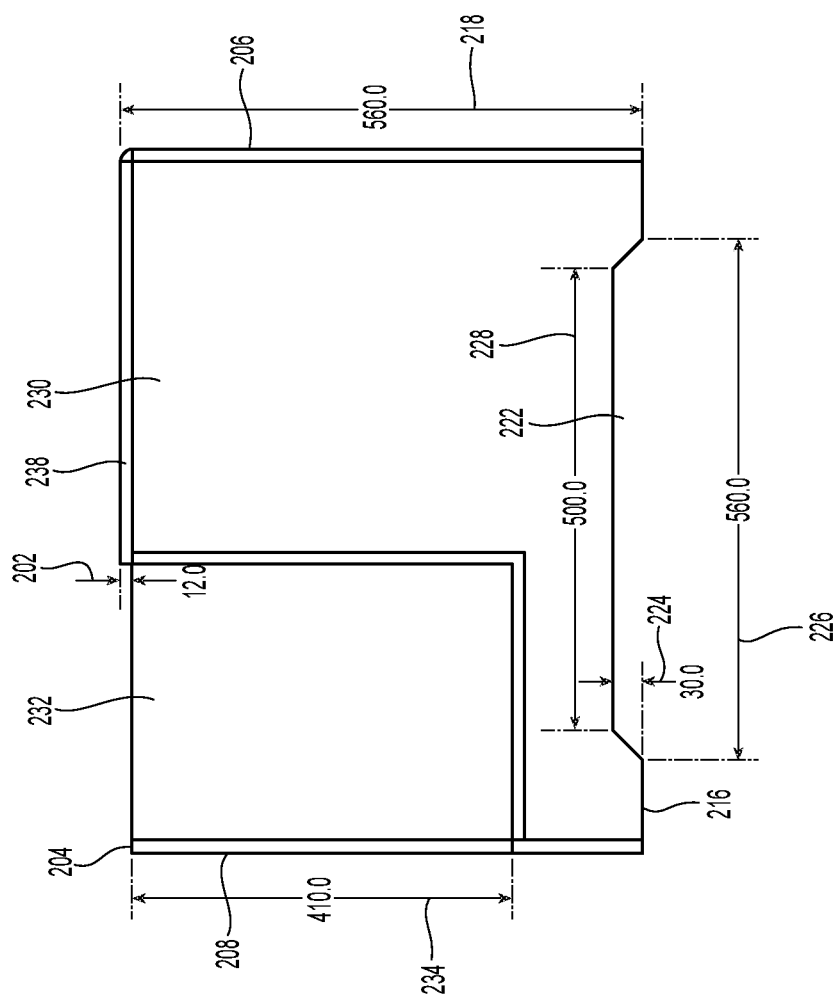
FIG. 4 is a is view through line 4-4 of FIG. 3.
Figure 5:
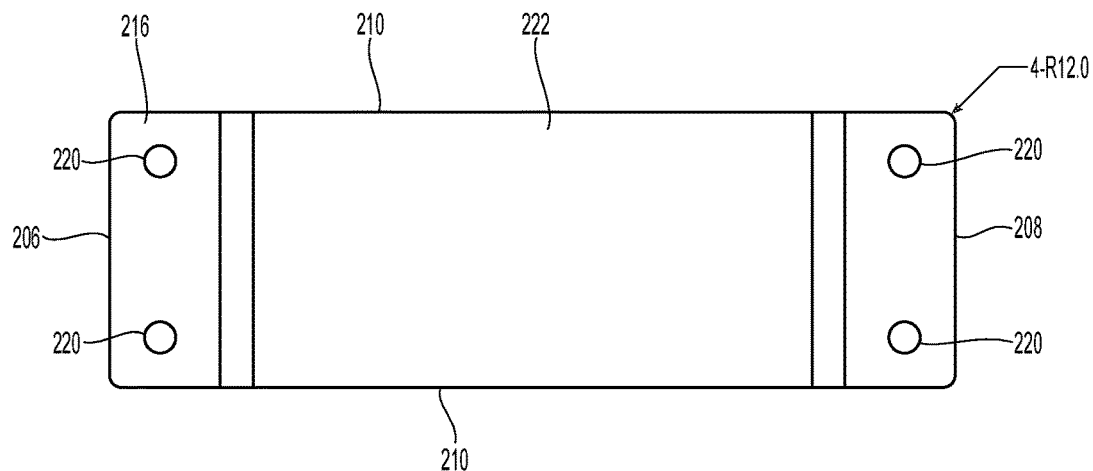
FIG. 5 is a is a bottom view of the self-supporting box.
Figure 6:
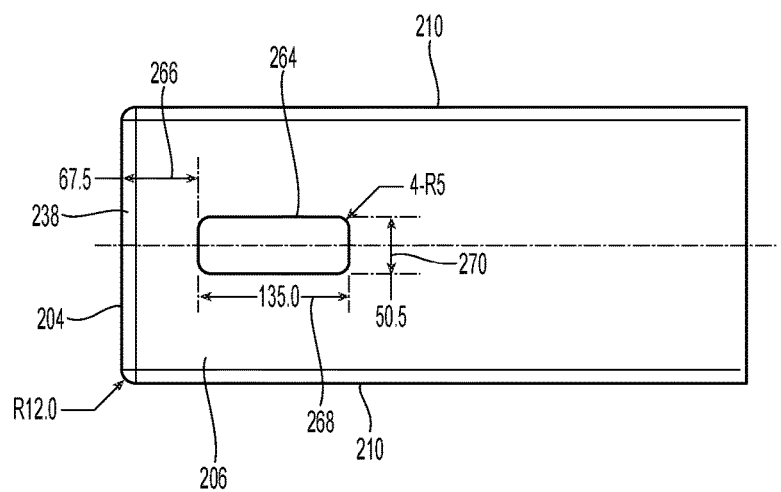
FIG. 6 is an elevational view of an embodiment of a first end of the self-supporting box.

Referring initially to FIG. 1, an exemplary embodiment of a room caddie 100 is illustrated. The room caddie can be placed at any desired location within a room including adjacent furniture such as chairs and couches or adjacent beds including stationary and adjustable beds. The room caddie includes a self-supporting box 102 and at least one object holder 104 releasably attached to the self-support box at a two-part releasable connector 110. The object holder secures a desired object 106 at a user-selected location and orientation, and the desired object can be attached to and removed from the object holder. The object holder has a length sufficient to extend up and over an occupant of a chair of bed.

As illustrated, the self-supporting box is a rectangular box covered in padded upholstery. The self-supporting box includes at least one moveable lid 108. In one embodiment, the moveable lid is attached to the self-supporting box by one or more hinges to provide selected access to interior storage chambers of the room caddie. The room caddie includes at least one exterior electrical power source 112. As illustrated, the exterior electrical power source is a universal serial bus (USB) port. In one embodiment, the room caddie includes a light source 114, for example, a USB light-emitting diode (LED) light source that is plugged into the exterior electrical power source. In one embodiment, the room caddie includes at least one cup holder 116 extending into the self-supporting box. Suitable cup holders include cylindrical cup holders. In one embodiment, the cup holder includes at least one of a heating mechanism and a cooling mechanism. The room caddie can also include other devices such as integrated speakers and wireless connectivity including blue-tooth and WIFI.

Referring to FIGS. 2-6, an exemplary embodiment of the self-supporting box 200 without the moveable lid is illustrated. The self-supporting box is configured to rest on the floor or other suitable horizontal surface and is constructed of materials that provide sufficient size and weight to support the load and weight of the attached object at any given location and orientation with respect to the self-supporting box. The self-supporting box does not require attachment to any other structure including any pieces of furniture. In addition, the self-supporting box does not need to be anchored to any surface including the floor. In one embodiment, the self-supporting box is formed from a material such as plywood, wood, metal or plastic having a thickness 202 of about 12 mm (0.5 inches). All portions and components of the self-supporting box are constructed from this material.

The self-supporting box 200 includes a top 204 or top side extending from a first end 206 of the box to a second end 208 of the box opposite the first end. A pair of opposing sides 210 are spaced from each other and extend from the first end to the second end. In one embodiment, the opposing sides are longer than the first and second ends, therefore, the top of the self-supporting box has a rectangular shape. In one embodiment, each opposing side has an opposing side length 212 of about 760 mm (30 inches), and the first end and the second end have an end width 214 of about 250 mm (8.8 to 8.9 inches).

The first end, second end and opposing sides extend down to a bottom 216 or bottom side of the self-supporting box. In one embodiment, the self-supporting box has a height 218 of about 560 mm (22 inches). In one embodiment, the bottom includes at least one and preferably of plurality of extensible legs 220. The extensible legs provide for leveling and can be used to prevent rocking. Any suitable extensible leg known and available in the art can be used. The bottom includes a cavity 222 extending into the bottom towards the top. The cavity is spaced from the first end and the second end and extends between the opposing sides, i.e., spans the width of the self-supporting box. In one embodiment, the cavity extends into the bottom a cavity depth 224 of about 30 mm (1.2 inches). The cavity extends along the bottom a cavity length 226 of about 560 mm (22 inches). The cavity length decreases within the cavity to an inner cavity length 228 of about 500 mm (19-20 inches).

The self-supporting box includes a first interior chamber 230 extending into the box from the top and disposed adjacent the first end of the box, and a second interior chamber 232 separate from the first interior chamber. The second interior chamber extends into the box from the top and is located between the first interior chamber and the second end. In one embodiment, the second interior chamber extends only partially into the box to a second interior depth 234 of about 410 mm (16 inches). Therefore, the first interior chamber extends under the second interior chamber and extends the entire length of the box between the second interior chamber and the bottom. In one embodiment, both the first interior chamber and the second interior chamber have an interior chamber width 236 of about 226 mm (9 inches). In one embodiment, the second interior chamber extends along the top of the box a second interior chamber length 260 of about 310 mm (12 inches).

The box includes a fixed cover 238 extending over and enclosing the first interior chamber at the top of the box and spanning the entire width of the box. The fixed cover, first end, second end and opposing sides meet at rounded corners. In one embodiment these rounded corners have a radius of about 12 mm (0.5 inches). The fixed cover includes a first circular cut-out 240 centered a first distance 254 from the first end of the box of about 330 mm (13 inches). The first circular cut-out 240 has a first diameter 248 of about 98 mm (3.8 inches). This diameter accommodates a cylindrical cup holder. The fixed cover includes a second circular cut-out 242 centered a second distance 256 from the first end of the box of about 140 mm (5.5 inches). The second circular cut-out 242 has a second diameter 250 of about 98 mm (3.8 inches). This diameter accommodates an exterior electrical power source such as a USB port. The fixed cover includes a third circular cut-out 246 centered a third distance 258 from the first end of the box of about 50 mm (2 inches). The third circular cut-out 246 has a third diameter 252 of about 19.5 mm (0.75 inches). This diameter accommodates the first part of a two-part releasable connector such as a socket, i.e., cylindrical socket, including a threaded socket and a tapered socket. Therefore, the second circular cut out is located between the first circular cut out and the third circular cutout, and the resulting exterior electrical power source will be located between the cylindrical cup holder and the two-part releasable connector. All cut-outs pass completely through the fixed lid.

In one embodiment, the third circular cut out is located between the first circular cut out and the second circular cutout, and the resulting two-part releasable connector will be located between the cylindrical cup holder and the exterior electrical power source. Therefore, the exterior electrical power source is spaced from the cup holder and potential sources of liquids. In this embodiment, the third circular cut out is located or centered a distance of about 215 mm (8.5 inches) from the first end, and the second circular cut out is located or centered a distance of about 45 mm (1.8 inches) from the first end.

In one embodiment, a rectangular area 262 is provided on the top surface and includes a water-proof material. The first circular cut-out is disposed in the rectangular area. Therefore, the cylindrical cup holder will be surrounded by an area of water-proof material. Suitable water-proof materials include laminates such as wood laminates and plastic laminates, e.g., vinyl including luxury vinyl tile material. In one embodiment, the rectangular area has dimensions of 150 mm×200 mm (6 inches×8 inches).

In one embodiment, the first end of the box includes an exterior electrical power source cut-out 264 passing completely through the first end. The exterior electrical power source cut-out is located a distance 266 from the top of the box of about 67.5 mm (2.7 inches) and is centered on the first end. The exterior electrical power source cut-out has a length 268 of about 135 mm (5.3 inches) and a width 270 of about 50.5 mm (2 inches). The length and width meet at rounded corners having a radius of about 5 mm (0.2 inches). The exterior electrical power source cut-out accommodates at least one and preferably a plurality of exterior electrical power sources including AC and DC power sources or sockets. In one embodiment, the exterior electrical power source cut-out provides for a power connector, such as a three-prong power connector, that can be used to attach a power cord to provide power to components located within the first interior chamber and interior electrical power sources located in the second interior chamber.

Figure 7:
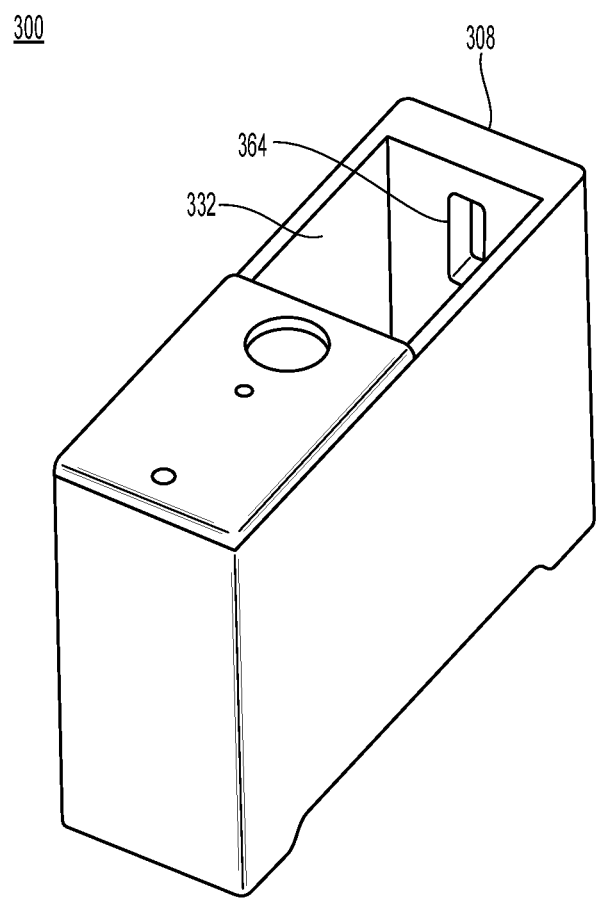
FIG. 7 is a is a top perspective view of another embodiment of a self-supporting box.

Referring now to FIG. 7, in another embodiment of the self-supporting box 300, the second end 308 of the box includes an interior electrical power source cut-out 364 passing completely through the second end. The interior electrical power source cut-out is located a distance from the top of the box of about 67.5 mm (2.7 inches) and is centered on the second end. The interior electrical power source cut-out has a length of about 135 mm (5.3 inches) and a width of about 50.5 mm (2 inches). The length and width meet at rounded corners having a radius of about 5 mm (0.2 inches). The interior electrical power source cut-out accommodates at least one and preferably a plurality of electrical power sources including AC and DC power sources or sockets disposed within the second interior chamber 332. In one embodiment, the interior electrical power source cut-out provides for a power connector, such as a three-prong power connector, exposed to the exterior of the room caddie that is used to attach a power cord to provide power to the interior electrical power sources.

Figure 8:
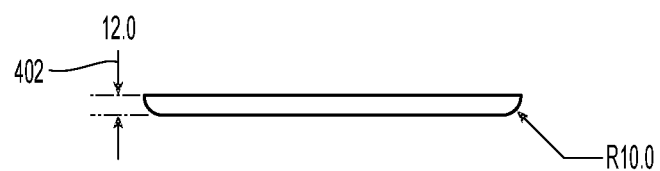
FIG. 8 is an end view of an embodiment of a moveable lid for use with the self-supporting box.
Figure 9:
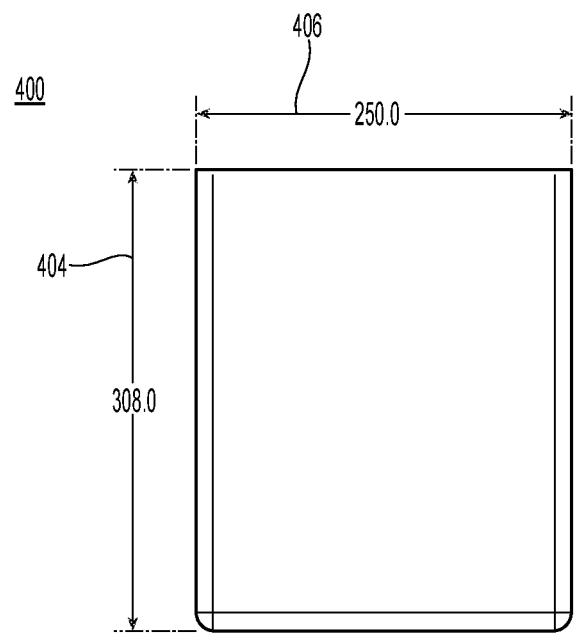
FIG. 9 is a top view of the moveable lid.

Referring now to FIGS. 8 and 9, a moveable lid 400 for use with the self-supporting box is illustrated. The moveable lid, when attached to the top of the box, for example, using a hinge along the second end, is disposed over the second interior chamber and provides access into the second interior chamber. Therefore, the moveable lid is sized to extend from the second end completely over the second interior chamber and to span the width of the box. The moveable lid is formed from the same materials used for the box and has a thickness 402 of about 12 mm (0.5 inches). In one embodiment, the moveable lid has length 404 of about 308 mm (12 inches) and a width 406 of about 250 mm (9.8 inches).

Figure 10:
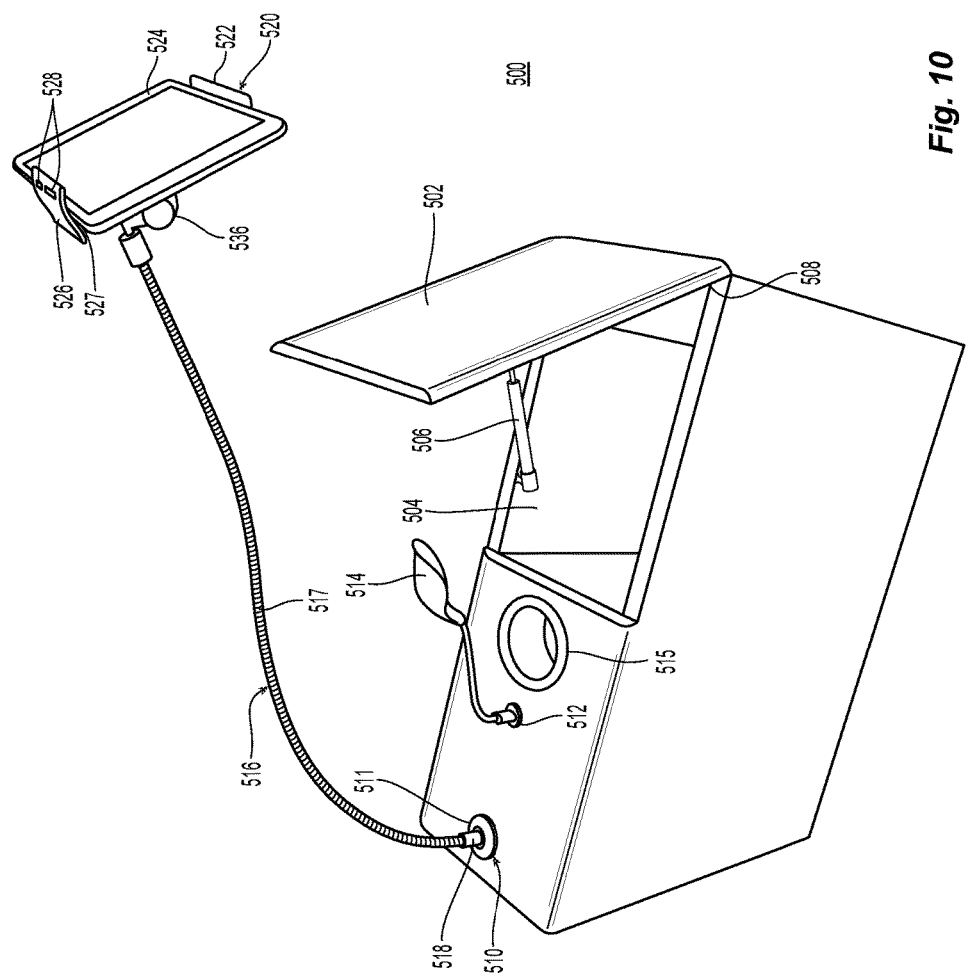
FIG. 10 is a top perspective view of another embodiment of a room caddie with the moveable lid open.
Figure 11:
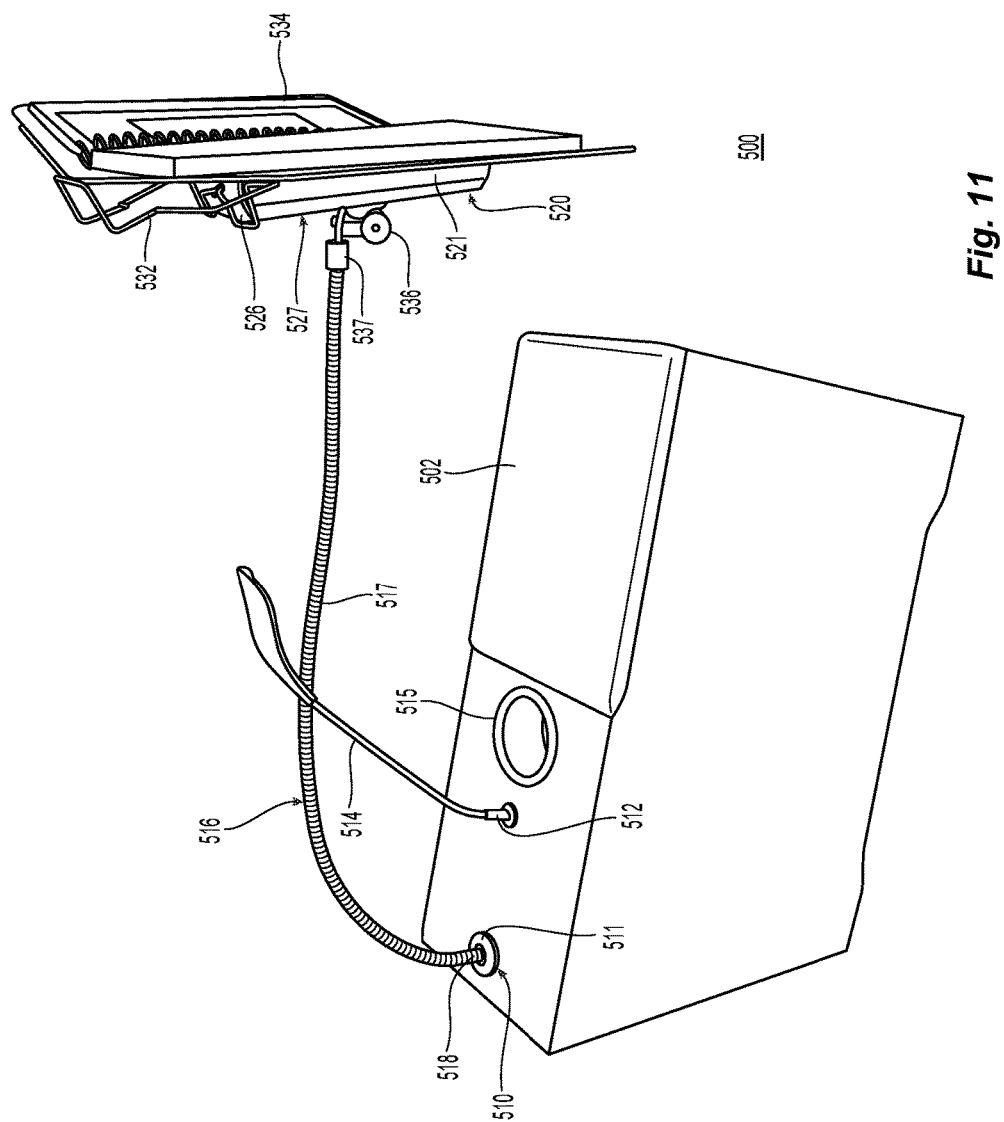
FIG. 11 is a top perspective view of the room caddie with the moveable lid closed.

Referring now to FIGS. 10 and 11, an exemplary embodiment of a room caddie 500 is illustrated with the moveable lid in an open position (FIG. 10) and a closed position (FIG. 11). The moveable lid is attached using to the tope along a hinged attachment end 508 and in one embodiment is held in the open position using a pneumatic piston 506. In the open position, the moveable lid provides access to the second interior chamber 504. All exterior surfaces and interior surfaces are upholstered.

The cylindrical cup holder 515 is disposed on the fixed cover and extends into the first interior chamber, and at least one exterior electrical power source 512 is disposed in the fixed cover. The cylindrical cup holder can include at least one of a cooling mechanism and a heating mechanism. In one embodiment, the cylindrical cup holder is surrounded by an illuminated ring, for example, a LED light ring. As illustrated, the exterior electrical power source is a USB port, and a light 514, for example an LED USB light, is plugged into the exterior electrical power source. The first interior chamber includes the wiring and electronics for the power sources, heating mechanism and cooling mechanism. In one embodiment, the first interior chamber houses a power source such as a battery. In another embodiment, a power cord (not shown) is provided to supply the power to the power supplies, transformers and other electronics.

The first part 510 of the two-part releasable connector is disposed in the fixed cover. In one embodiment, the first part includes a stainless steel collar 511 surrounding the first part. The room caddie includes an object holder 516. The object holder includes a flexible arm 517 capable of maintaining a selected shape and of supporting an object at one end in any selected shape. Therefore, the flexible arm can support a tablet computer or book in a position above of the self-supporting box and cantilevered over the ends or sides of the self-supporting box. Suitable materials for the flexible arm include a pliable rod, for example, an aluminum rod. The pliable rod can be covered in a plastic sheath or rubberized coating. In one embodiment, the flexible arm is constructed from flexible or corrugated tubing such as flexible copper tubing having straight ends for attachment of fittings.

Preferably, the flexible arm is constructed from a plurality of articulated sections such as a plurality of articulated metal sections. Each section can move relative to the other sections to form the desired shape. In one embodiment, the flexible arm is formed from several, e.g., two or three, articulating sections. Alternatively, the flexible arm is formed from a plurality of small articulation sections, where each individual section has a relatively small length. In one embodiment, the flexible arm has an overall length of up to about 36 inches. This accommodates placement next to a chair or bed with sufficient length to position an object over the occupant of the chair or bed.

The second part 518 of the two-part releasable connector is attached to the flexible arm at a first end. In one embodiment, the first part of the two-part releasable connector is a socket, and the second part of the two-part releasable connector is an insert sized and shaped to fit within the socket. Preferably, the insert is rotatable within the socket. Therefore, the object holder can be easily rotated away from an occupant of a chair or bed without moving or adjusting the shape of the flexible arm. In one embodiment, the socket and insert are tapered.

An object attachment mechanism 520 is attached to the flexible arm at a second end 537 opposite the first end. In one embodiment, the object attachment mechanism is attached to the flexible arm using a rotating and pivoting attachment member 536. The object attachment mechanism includes a fixed member 521 attached to the flexible arm or the rotating and pivoting attachment member. The fixed member includes a support surface 522 to support an object such as a tablet computer 524 or a book 534. A clamping member 527 is attached to the fixed member and includes a clamping surface 526 to engage the object, i.e., a side of the object opposite the support surface. Therefore, the object is disposed between the clamping surface and the support surface. The clamping member is moveable with respect to the fixed member to change a distance between the clamping surface and the support surface. The clamping member can be secured or locked at any given distance.

In one embodiment, the clamping member includes a plurality of holes or slots 528 to provide access through the clamping surface to the object. These holes accommodate, for example, access to buttons, communication ports, audio ports and power supply ports on the object. In one embodiment, the object holder further includes an attachable extender 532 configured to attach to the holes to accommodate objects having dimensions greater than a maximum distance between the support surface and the clamping surface, e.g., large books.

Figure 12:
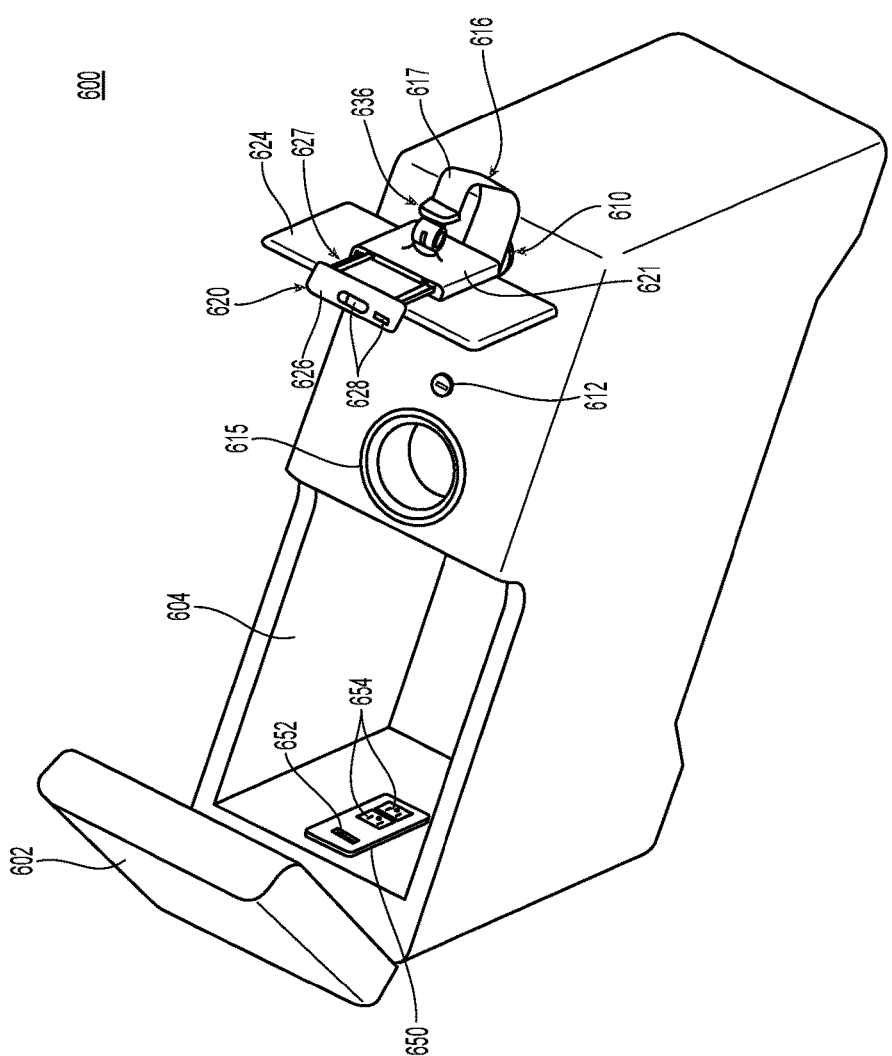
FIG. 12 is a top perspective view of another embodiment of a room caddie with the moveable lid open.

Referring now to FIG. 12, an exemplary embodiment of a room caddie 600 is illustrated with the moveable lid 602 in an open position. In the open position, the moveable lid provides access to the second interior chamber 604 and to the plurality of interior electrical power sources 650 disposed within the second interior chamber. As illustrated, these interior electrical power sources include a USB port 652 and two AC sockets 654. Therefore, an object such as a tablet computer 624 can be stored in the second interior chamber while being charged.

The cylindrical cup holder 615 is disposed on the fixed cover and extends into the first interior chamber, and at least one exterior electrical power source 612 is disposed in the fixed cover. The cylindrical cup holder can include at least one of a cooling mechanism and a heating mechanism. In one embodiment, the cylindrical cup holder is surrounded by an illuminated ring, for example, a LED light ring.

The first part 610 of the two-part releasable connector is disposed in the fixed cover. The room caddie includes an object holder 616. The object holder includes a flexible arm 617 capable of maintaining a selected shape. As illustrated, the flexible arm is a length of flat, spring steel formed in a "J" shape. The second part of the two-part releasable connector is attached to the flexible arm at a first end and is engaged in the first part of the two-part releasable connector.

An object attachment mechanism 620 is attached to the flexible arm at a second end opposite the first end. In one embodiment, the object attachment mechanism is attached to the flexible arm using a rotating and pivoting attachment member 636. The object attachment mechanism includes a fixed member 621 attached to the flexible arm or the rotating and pivoting attachment member. The fixed member includes a support surface to support an object such as a tablet computer 624. A clamping member 627 is attached to the fixed member and includes a clamping surface 626 to engage the object, i.e., a side of the object opposite the support surface. Therefore, the object is disposed between the clamping surface and the support surface. The clamping member is moveable with respect to the fixed member to change a distance between the clamping surface and the support surface. The clamping member can be secured or locked at any given distance. In one embodiment, the clamping member includes a plurality of holes or slots 628 to provide access through the clamping surface to the object. These holes accommodate, for example, access to buttons, communication ports, audio ports and power supply ports on the object.

Figure 13:
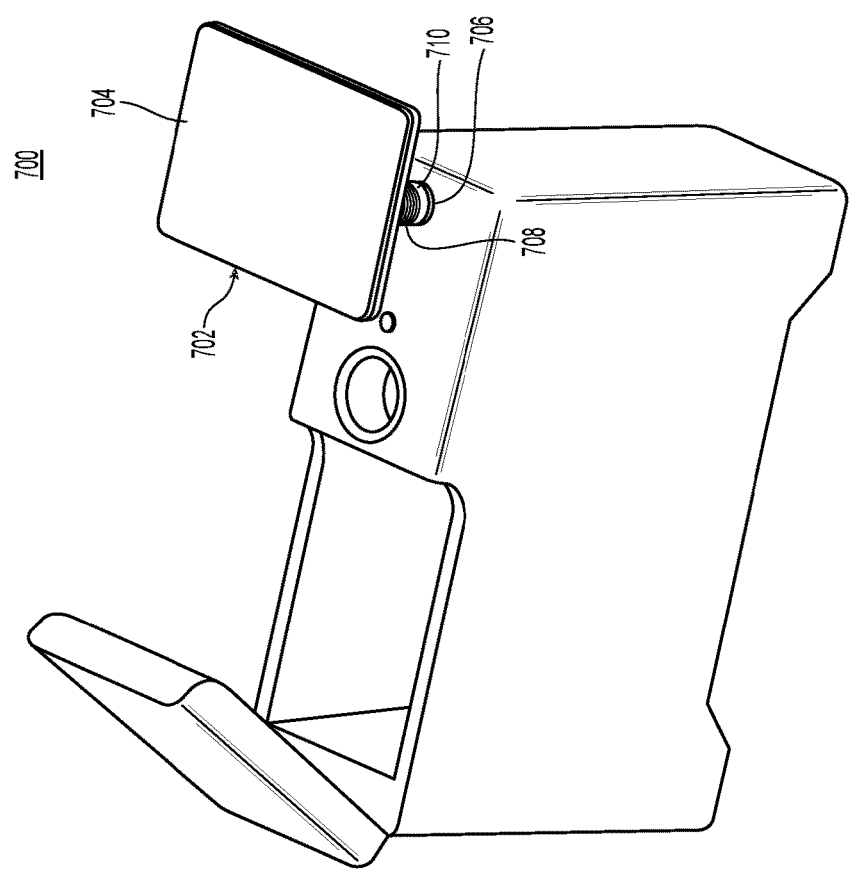
FIG. 13 is a top perspective view of another embodiment of a room caddie with the moveable lid open.

Referring now to FIG. 13, another exemplary embodiment of the room caddie 700 is illustrated. In this embodiment, the room caddie includes a table 702 attached to the first part 706 of the two-part releasable connector. The table includes a working surface 704 attached to a support column 708, which is the second part of the two-part releasable connector. In one embodiment, the working surface is flat, rectangular surface. Preferably, the support column is extensible to raise and lower the height of the working surface. In one embodiment, the support column is a threaded rod, and the first part of the two-part releasable connecter includes a threaded collar 710. Rotating the working surface rotates the support column, moving the support column into and out of the first interior chamber and adjusting the height of the working surface. In another embodiment, the support column is a rod in communication with an actuator located in the first interior chamber. The actuator is controlled using a wired or wireless remote to extend or retract the support column from or into the first interior chamber. This adjusts the height of the table about the fixed cover. In one embodiment, the two-part releasable connector is disposed between the end of the extensible support column and the table. In one embodiment, the support arm is formed as a telescoping arm.

In one embodiment, the support column is the flexible arm constructed from the pliable material or plurality of articulated sections. Therefore, the flexible arm can be retracted into the first interior chamber. When extended from the first interior chamber the flexible arm can then be positioned and formed into the desired location and orientation. In one embodiment, the flexible arm can be selectively rigid or flexible. Therefore, the flexible arm can be set in a rigid and straight position for extension and retraction and in a flexible position for adjustment following extension. In one embodiment, the two-part releasable connector is attached to an end of the flexible arm to allow selective attachment of the table, object attachment mechanism or the rotating and pivoting attachment member.

Although the features and elements of the present exemplary embodiments are described in the embodiments in particular combinations, each feature or element can be used alone without the other features and elements of the embodiments or in various combinations with or without other features and elements disclosed herein. This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A room caddie comprising:
a self-supporting box comprising:
a top extending from a first end of the box to a second end of the box opposite the first end;
a first interior chamber extending into the box from the top and disposed adjacent the first end of the box;
a second interior chamber separate from the first interior chamber, extending into the box from the top and located between the first interior chamber and the second end, the second interior space comprising a plurality of interior electrical power sources;
a fixed cover disposed over the first interior chamber at the top of the box, the fixed cover comprising:
a cylindrical cup holder disposed on the fixed cover and extending into the first interior chamber;
at least one exterior electrical power source disposed in the fixed cover; and
a first part of a two-part releasable connector disposed in the fixed cover; and
a moveable lid disposed over the second interior chamber at the top of box to provide access into the second interior chamber.

2. The room caddie of claim 1, wherein:
the box comprises a bottom opposite the top; and
the first interior chamber extends between the bottom of the box and the second interior chamber.

3. The room caddie of claim 1, wherein the plurality of interior electrical power sources comprises at least one AC power source and at least one DC power source.

4. The room caddie of claim 1, wherein the fixed cover further comprises an illuminated ring surrounding the cylindrical cup holder.

5. The room caddie of claim 1, wherein the cylindrical cup holder comprises at least one of a heating mechanism and a cooling mechanism.

6. The room caddie of claim 1, wherein the exterior electrical power source comprises a universal serial bus port.

7. The room caddie of claim 1, wherein the moveable lid is attached to the second end of the box by a hinge.

8. The room caddie of claim 1, wherein the box, the fixed cover and the moveable lid comprise upholstered surfaces.

9. The room caddie of claim 1, wherein:
the box comprises:
a bottom opposite the top; and
a pair of opposing sides spaced from each other and extending from the first end to the second end and from the top to the bottom; and
the bottom comprises a cavity extending into the bottom towards the top, the cavity spaced from the first end and the second end and extending between the opposing sides.

10. The room caddie of claim 1, wherein the box further comprises:
a bottom opposite the top; and
a plurality of extensible legs attached to the bottom.

11. The room caddie of claim 1, further comprising an object holder comprising
a flexible arm capable of maintaining a selected shape;
a second part of the two-part releasable connector attached to the flexible arm; and
an object attachment mechanism attached to the flexible arm.

12. The room caddie of claim 11, wherein the flexible arm comprises a pliable rod.

13. The room caddie of claim 11, wherein the flexible arm comprises a plurality of articulated metal sections.

14. The room caddie of claim 11, wherein the flexible arm comprises a length of up to about 36 inches.

15. The room caddie of claim 11, wherein:
the first part of the two-part releasable connector comprises a socket; and
the second part of the two-part releasable connector comprises an insert sized and shaped to fit within the socket, the insert rotatable within the socket.

16. The room caddie of claim 11, wherein the object attachment mechanism comprises:
a fixed member attached to the flexible arm and comprising a support surface to support an object; and
a clamping member attached to the fixed member and comprising a clamping surface to engage the object, the object disposed between the clamping surface and the support surface and the clamping member moveable with respect to the fixed member to change a distance between the clamping surface and the support surface.

17. The room caddie of claim 16, wherein the clamping member comprises a plurality of holes providing access through the clamping surface to the object.

18. The room caddie of claim 16, wherein the clamping member is lockable at any given distance between the clamping surface and the support surface.

19. A room caddie comprising:
a self-supporting box comprising:
a top extending from a first end of the box to a second end of the box opposite the first end;
a first interior chamber extending into the box from the top and disposed adjacent the first end of the box;
a second interior chamber separate from the first interior chamber, extending into the box from the top and located between the first interior chamber and the second end, the second interior space comprising a plurality of interior electrical power sources;
a fixed cover disposed over the first interior chamber at the top of the box, the fixed cover comprising:
a cylindrical cup holder disposed on the fixed cover and extending into the first interior chamber;
at least one exterior electrical power source disposed in the fixed cover; and
a first part of a two-part releasable connector disposed in the fixed cover; and
a moveable lid disposed over the second interior chamber at the top of box to provide access into the second interior chamber; and
an object holder comprising:
a flexible arm capable of maintaining a selected shape;

a second part of the two-part releasable connector attached to the flexible arm;

an object attachment mechanism attached to the flexible arm and comprising:
- a fixed member attached to the flexible arm and comprising a support surface to support an object;
- a clamping member attached to the fixed member and comprising a clamping surface to engage the object, the object disposed between the clamping surface and the support surface and the clamping member moveable with respect to the fixed member to change a distance between the clamping surface and the support surface; and
- a plurality of holes providing access through the clamping surface to the object; and an extender configured to attach to the holes to accommodate objects having dimensions greater than a maximum distance between the support surface and the clamping surface.

20. A room caddie comprising:

a self-supporting box comprising:
- a top extending from a first end of the box to a second end of the box opposite the first end;
- a first interior chamber extending into the box from the top and disposed adjacent the first end of the box;
- a second interior chamber separate from the first interior chamber, extending into the box from the top and located between the first interior chamber and the second end, the second interior space comprising a plurality of interior electrical power sources;
- a fixed cover disposed over the first interior chamber at the top of the box, the fixed cover comprising:
  - a cylindrical cup holder disposed on the fixed cover and extending into the first interior chamber;
  - a rectangular area comprising a water-proof material and covering only a portion of the fixed cover, the cylindrical cup holder disposed in the rectangular area;
  - at least one exterior electrical power source disposed in the fixed cover; and
  - a first part of a two-part releasable connector disposed in the fixed cover; and
- a moveable lid disposed over the second interior chamber at the top of box to provide access into the second interior chamber.

* * * * *